(12) United States Patent
Metcalf et al.

(10) Patent No.: US 8,761,153 B2
(45) Date of Patent: Jun. 24, 2014

(54) REMOTE CONFIGURATION OF A VOICE OVER INTERNET PROTOCOL TELEPHONE FOR SMART DIAL TONE

(76) Inventors: Michael D. Metcalf, Ladera Ranch, CA (US); David L. Thomson, Lisle, IL (US); Paul Laos, Aliso Viejo, CA (US); Hung Duong, Garden Grove, CA (US); Tracy Roberts, Mountain View, CA (US)

(*) Notice: Subject to any disclaimer, the term of this patent is extended or adjusted under 35 U.S.C. 154(b) by 1030 days.

(21) Appl. No.: 11/157,574

(22) Filed: Jun. 21, 2005

(65) Prior Publication Data

US 2006/0285535 A1    Dec. 21, 2006

(51) Int. Cl.
*H04L 12/66* (2006.01)
*H04L 29/06* (2006.01)
*H04M 7/00* (2006.01)
*H04M 3/42* (2006.01)
*H04M 1/253* (2006.01)
*H04M 3/493* (2006.01)

(52) U.S. Cl.
CPC ........ *H04L 29/06027* (2013.01); *H04L 65/104* (2013.01); *H04M 1/2535* (2013.01); *H04L 65/103* (2013.01); *H04L 65/1036* (2013.01); *H04M 7/0069* (2013.01); *H04M 2201/40* (2013.01); *H04M 3/493* (2013.01); *H04L 65/1026* (2013.01); *H04M 2203/554* (2013.01); *H04M 3/42178* (2013.01)
USPC ......................................... 370/352

(58) Field of Classification Search
USPC ................. 370/351–356; 709/222, 220–221; 379/88.01, 88.03, 88.17, 88.2, 216.01
See application file for complete search history.

(56) References Cited

U.S. PATENT DOCUMENTS

| | | | | |
|---|---|---|---|---|
| 5,161,184 A | * | 11/1992 | Smith et al. | 379/413 |
| 6,847,704 B1 | * | 1/2005 | Cherchali et al. | 379/93.05 |
| 7,194,257 B2 | * | 3/2007 | House et al. | 455/418 |
| 7,246,154 B1 | * | 7/2007 | Sitaraman et al. | 709/217 |
| 7,346,152 B2 | * | 3/2008 | Paden et al. | 379/88.16 |
| 2002/0091574 A1 | * | 7/2002 | Lefebvre et al. | 705/19 |
| 2003/0039239 A1 | * | 2/2003 | Ollis | 370/352 |
| 2004/0049562 A1 | * | 3/2004 | Kikinis | 709/220 |
| 2006/0029051 A1 | * | 2/2006 | Harris et al. | 370/356 |
| 2006/0147019 A1 | * | 7/2006 | Veschi | 379/216.01 |
| 2006/0221940 A1 | * | 10/2006 | Ong et al. | 370/352 |

* cited by examiner

*Primary Examiner* — Sonia Gay
(74) *Attorney, Agent, or Firm* — BP Law Group

(57) ABSTRACT

An Internet Access Device (IAD) is pre-configured with first, generic configuration information designating the address of a configuration server with which it will establish a communication session when the IAD is first powered up and connected to the Internet. The configuration server then downloads a second, specific configuration to the IAD, such as a hotline number designating a specific speech server, and creates a network data record to link a unique identifier for the IAD, such as a serial number, with a user account. When the IAD goes off-hook, the IAD connects directly to a speech server using the second configuration. The speech server provides a smart dial tone, such as a voice prompt. The speech server responds to a verbal request spoken by a user by performing a corresponding activity, such as placing a telephone call or providing voicemail access.

26 Claims, 2 Drawing Sheets

REMOTE CONFIGURATION OF A VOICE OVER INTERNET PROTOCOL TELEPHONE FOR SMART DIAL TONE

FIELD OF THE INVENTION

The present invention relates to speech recognition and Voice over Internet Protocol ("VoIP") systems and methods and, more particularly, to remote configuration of a VoIP telephone for smart dial tone for providing voice activation for VoIP calls.

BACKGROUND OF THE INVENTION

Currently, Voice over Internet Protocol (VoIP) provides a low-cost, powerful interface to the telephone network. For a voice signal to travel over the Internet, a device is required that can convert analog voice signals to packets and vice versa, such as an Internet access device ("IAD"), a media gateway or similar device. IADs and media gateways have similar functions, to convert between analog and packet signals, although the term "media gateway" is often used for larger systems that reside in switching centers and the term "IAD" for smaller systems in residences and small businesses. While their features may differ in some instances, we consider them as equivalent.

In a typical VoIP configuration, an analog telephone is plugged into the IAD and the IAD is plugged into a router, a modem, or some other Internet connection. The IAD is registered with a softswitch (a type of gatekeeper) using SIP (session initiation protocol) or H.323 that provides registration, address translation, and call authorization. When a user picks up the telephone handset (i.e., goes off-hook) and dials a telephone number, the softswitch receives the digit string and determines the location of the call destination. The destination may be an Interactive Voice Response (IVR) server, a speech server (a type of IVR server that includes speech recognition and/or text-to-speech synthesis capabilities), another IAD, a VoIP phone, or another communication device. Once the softswitch determines the call destination, it sets up a connection from the originating IAD to the destination and the call may proceed. When the originating user speaks, the voice signal is digitized and converted to packets by the IAD, then sent over the Internet to the destination. If the destination is a typical telephone or some other analog system such as a TDM (Time Division Multiplexing) IVR server, the packets are transmitted to an IAD or gateway to convert the packets to an analog audio signal, which in turn is transmitted to the telephone or analog system.

If a user wishes to access an advanced service that provides speech control for VoIP, the user must currently dial a telephone number corresponding to the speech server. An alternative would be to connect the user to the speech server immediately when the user goes off-hook. This "hotline" or "ringdown" function requires that the IAD be programmed with the predetermined telephone number or network address. Such a predetermined telephone number, network address, or any other set of characters that specifies the speech server location is referred to herein as a "hotline address." The drawback of this prior art preprogramming of the IAD is that there are many circumstances where the hotline address is either unknown in advance or must be changed after the IAD has been shipped and installed. For example, it may be inconvenient or costly to configure the IAD before shipping. Also for example, where there are several speech servers available, the service provider may desire to route the user's call to a different server to balance traffic loads, to offer a different set of features or a specific language, or to route calls away from failed equipment. In addition, similar prior art difficulties apply for other configuration fields in the IAD, and on the network side of the speech service (a service provided by one or more servers, one of which is a speech server).

Prior art user-configuration also suffers from various difficulties. While some IADs are user-configurable, such configuration by the user is inconvenient and may be beyond the abilities of some users. Also, it is not always desirable to reveal configuration information such as the IAD login password and the hotline number to the user. In addition, as mentioned above, after initial configuration, a service provider may want to subsequently and dynamically alter a current configuration, such as for load balancing or provision of additional features.

As a consequence, a need remains for a method and system to dynamically, automatically and remotely configure an IAD for speech recognition capabilities, such as smart dial tone. Such a system and method should be able to initially provide, remotely, the hotline address and other IAD configuration data in the IAD for a speech server, after the IAD is shipped and installed, and with little or no user intervention. In addition, such a system and method should also be operative to dynamically, automatically and remotely alter or modify such IAD configurations for the provision of various speech service capabilities and features, such as speech recognition and various forms of smart dial tone.

SUMMARY OF THE INVENTION

The exemplary method and system embodiments of the present invention provide for dynamically, automatically and remotely configuring an IAD or VoIP telephone for speech recognition capabilities, such as smart dial tone. The exemplary embodiments initially and remotely provide the hotline address and other IAD/VoIP telephone configuration data in the IAD/VoIP telephone for a speech server, after the IAD/VoIP telephone is shipped and installed, and with little or no user intervention. In addition, the exemplary embodiments are also dynamic, and are able to automatically and remotely alter or modify such IAD/VoIP telephone configurations for the provision of various speech service capabilities and features, such as speech recognition and various forms of smart dial tone.

A first exemplary embodiment provides a method of providing access to a speech service, which comprises: establishing a first communication session with a predetermined configuration server and a calling device, the predetermined configuration server designated by a first configuration provided in the calling device; downloading from the predetermined configuration server a second configuration for the calling device; using the second configuration, automatically establishing a second communication session with a predetermined speech server, the predetermined speech server designated by the second configuration; receiving at the predetermined speech server at least one voice sample provided by the calling device; and in response to the voice sample, the predetermined speech server performing a corresponding activity.

A second exemplary embodiment provides a system for providing access to a speech service for a calling device, in which the calling device is coupled to the system through a communication network, such as the Internet. The system comprises a configuration server and a speech server. The configuration server is coupled to the communication network and designated by a first configuration provided in the calling device, with the configuration server adapted to download a second configuration to the calling device during a first communication session established with the calling device. The speech server is coupled to the communication network and designated by the second configuration, with the speech server adapted to receive at least one voice sample provided by the calling device during a second communication session automatically established by an off-hook condition of the calling device, and the speech server further adapted to perform a corresponding activity in response to the voice sample.

A third exemplary embodiment provides a system for providing access to a speech service for a calling device, in which the calling device is also coupled to the system through a communication network. The system comprises a configuration server, a data repository, and a speech server. The configuration server is also coupled to the communication network and designated by a first configuration provided in the calling device. The configuration server is adapted to download a second configuration to the calling device during a first communication session established with the calling device, in which the second configuration comprising a telephone number associated with a speech server or an Internet Protocol address associated with the speech server, and wherein the configuration server is further adapted to receive an upload of a unique identifier of the calling device and user account information. The data repository is coupled to the configuration server, and is adapted to store a network data record to link a unique identifier for the IAD with a user account. The speech server is also coupled to the communication network and designated by the second configuration, with the speech server adapted to receive at least one voice sample provided by the calling device during a second communication session automatically established by an off-hook condition of the calling device, and the speech server further adapted to-perform a corresponding activity in response to the voice sample.

These and additional embodiments are discussed in greater detail below. Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings and examples which form a portion of the specification, in which.

DETAILED DESCRIPTION OF EXEMPLARY EMBODIMENTS

Figure 1:
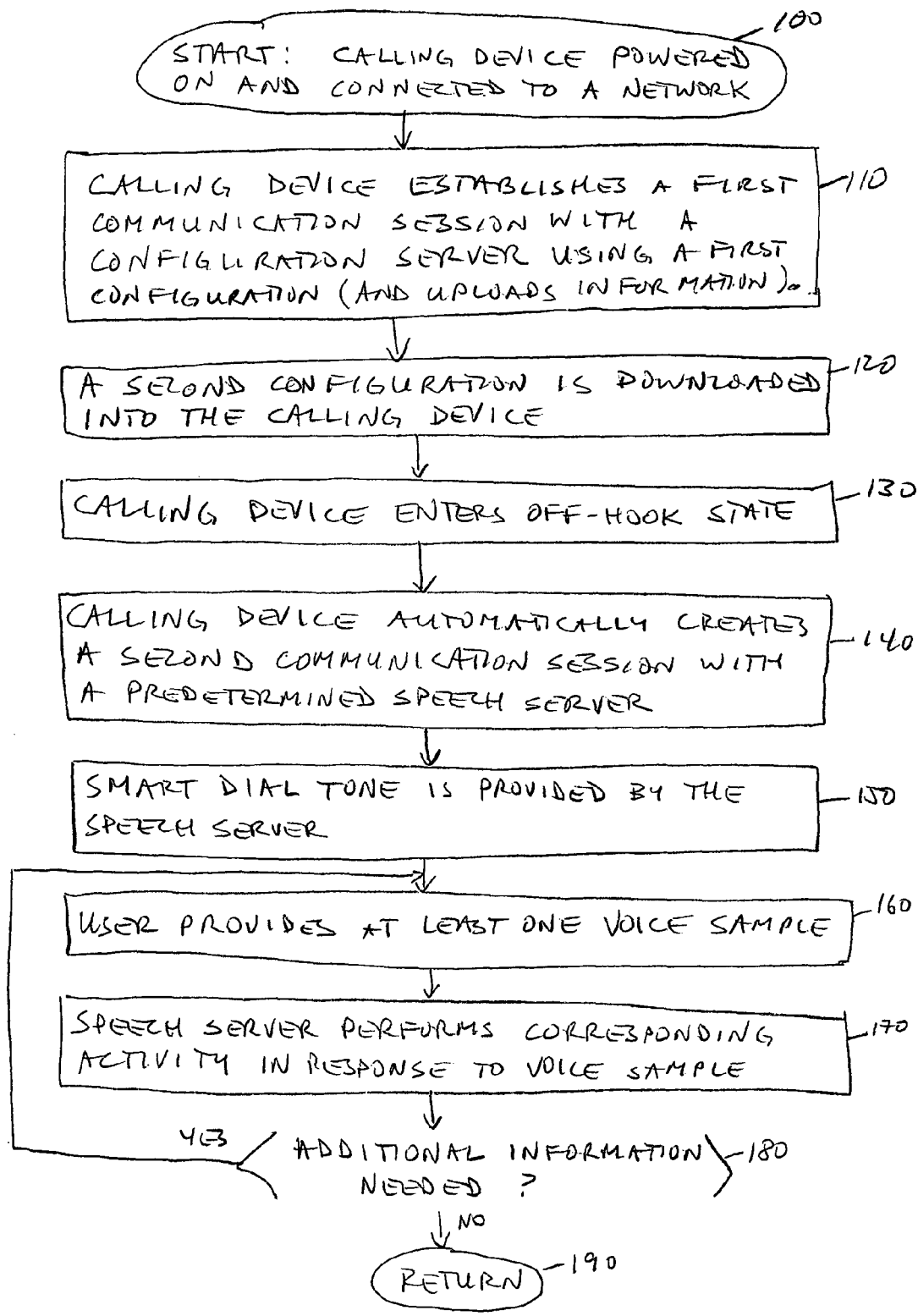
FIG. 1 is a flow diagram illustrating an exemplary method embodiment in accordance with the teachings of the present invention.

While the present invention is susceptible of embodiment in many different forms, there are shown in the drawings and will be described herein in detail specific examples and embodiments thereof, with the understanding that the present disclosure is to be considered as an exemplification of the principles of the invention and is not intended to limit the invention to the specific examples and embodiments illustrated, and that numerous variations or modifications from the described embodiments may be possible and are considered equivalent.

As used herein, IAD and VoIP telephone may be utilized interchangeably, with the understanding that an IAD may also be implemented as a component of a VoIP telephone, as illustrated below. As a consequence, reference to an IAD or VoIP telephone will be understood to mean and include the other.

In an exemplary embodiment, an IAD is pre-configured with initial or "generic" configuration information before shipping, including an address, such as an IP address, of a configuration server that it will seek when it is first powered up and connected to the Internet. The user of the IAD then logs onto a website and provides the user account information and the serial number of the IAD/VoIP telephone or some other unique identifier, such as the media access control ("MAC") address). Alternatively, the IAD may be configured to automatically upload its unique identifier, with the user prompted to provide account information through a key pad or keyboard, for example. The configuration server then automatically downloads the more "specific" or operational configuration information which is specifically assigned to the given IAD, including a hotline number, and creates a network data record to link the IAD identifier (e.g., serial number) to the user's account.

In other exemplary embodiments, other or additional configuration fields are set up, in addition to the hotline number, both on the IAD and on the network side of the speech service. For example, automatic number identification ("ANI") and calling party identification ("Caller ID") may be set up on the IAD, and the speech service may be set up to identify which account corresponds to the selected IAD. The user account information may also be part of the configuration. The speech service may be based on a paid subscription or on per-minute charges and may need to know that a certain IAD is associated with a given account. Specifically, the IAD MAC address, ANI, CallerID, or other IAD/VoIP telephone identifier may appear in a database in the network side of the speech service as belonging to the account of a particular user. By mapping or linking the IAD/VoIP telephone identifier to the account information, the speech service can recognize the user and activate the user account when he/she calls without requiring the user to login.

Also in the exemplary embodiments, this configuration server at the predefined or pre-configured IP address utilizes any configuration information input from either or both the user and/or the IAD, and assigns a hotline address to and otherwise configures the specific, selected IAD. At some point, the user goes off-hook and the selected IAD automatically connects to the server at this hotline address, connecting the IAD to the designated speech server, all without user intervention. For example, the user is not required to press any touch-tone buttons or input any information. In accordance with the exemplary embodiments of the present invention, the speech server plays a voice prompt for the user, instead of generating a dial tone. The prompt may be, for example, a beep, a dial tone that is different from a normal dial tone to indicate that the speech recognizer is listening, or a spoken phrase such as, "What would you like to do?" This voice prompt is referred to herein as a "smart dial tone," because the user has more options than with a regular dial tone, and may behave differently, such as speaking a name or telephone number, in addition to inputting numbers through a keypad.

In response to the smart dial tone (voice prompt), in the exemplary embodiments, the user may speak the name or phone number of the person he/she wishes to call, dial a number with touch-tones, ask for help, play games, check a horoscope, access a new service, check stock prices, make stock trades, make reservations for hotels, restaurants or other services, access bank accounts, check voicemail or email, or set up a conference call, for example. The user may also change his/her personal profile information by saying, "Cancel call forwarding," "Forward all calls to my office," "Change my voicemail greeting," "change billing options," "Conditional call blocking," "Follow-me," and so on. The user may respond to a smart dial tone with a request for information, a command to execute a transaction, a request for information on the Internet, or other voice samples that may be understood by a speech server. In an alternative embodiment, the smart dial tone may be produced by the IAD or by some element in the network other than the speech server. In another embodiment, the speech server function may be incorporated into the IAD. By remotely configuring the IAD and allowing the use of voice commands, the various exemplary embodiments of the present invention make it easier and faster for a user to gain access to voice and data services.

Referring now to the drawings wherein like reference numerals are used to identify identical components in the various views, FIG. 1 is a flow diagram illustrating an exemplary method embodiment for configuring and using a speech service in accordance with the teachings of the present invention. The method begins at step 100, with the calling device such as an IAD being powered on and provided with a connection to the Internet, the public switched telephone network ("PSTN"), or other suitable network. Next, in step 110, using the first configuration (the pre-configured, generic information) previously stored in the calling device (such as by the manufacturer or service provider, prior to receipt by the user), the calling device automatically establishes a first communication session with a configuration server, via the network, and may upload information, such as the calling device identifier (e.g., serial number) discussed above. While referred to as a session, in exemplary embodiments, this session is typically a communication or connection of any kind, such as the transmission of one or more IP data packets, or may be other forms of communications or connections. In one embodiment of the invention, the calling device is an IAD connected to a telephone. In alternative embodiments, for example, the calling device may be a VoIP phone, VoIP software, a peer-to-peer phone, peer-to-peer software, a PBX connected to an analog telephone, a digital telephone such as an ISDN phone, a programmable telephone, a software program with phone capabilities, a video phone, a media gateway at a user site, a media gateway at a central office serving one or more users, or another communication device capable of downloading a configuration. For purposes of the current invention, we consider "analog," "digital," and "TDM" equipment as functionally equivalent, because they all input or output a continuous signal, as opposed to discrete data packets.

Following the establishment of the session, in step 120, the calling device downloads from the configuration server a second configuration, such as a selected or specific configuration, from among a plurality of configurations, and stores the configuration information in memory, such as in non-volatile memory integrated circuits ("ICs"). Typically, this second configuration includes a hotline number for establishing a session with a selected speech service, e.g., with a speech server, and may also include other configuration fields discussed above. Steps 110 and 120 are executed at least once after the calling device is installed in a given location, and may also be executed subsequently as warranted, such as in a default mode when an IAD is unable to access the speech service corresponding to the specific configuration information (such as the current hotline number). In contrast, as discussed below, step 130 through step 160 are executed as appropriate or each time the user wishes to place or receive a call or access a data service.

Continuing to refer to FIG. 1, in step 130, the calling device goes off-hook, meaning that it is preparing to establish a voice connection. The off-hook condition may be caused by the user picking up a handset or pressing a button such as a line button on a multi-line telephone. The off-hook condition may be in response to an incoming call, when the telephone or calling device is powered up, when the telephone or calling device software is started, when the user speaks a voice command such as "pick up the phone" or "answer the call," or when the user clicks an icon on a computer, touches a specified region of a touch-screen, or types a command on a keyboard, for example. The off-hook condition may also be triggered by a hardware device or a software program such as a calendar manager or voicemail system. If a calendar manager or voicemail system causes an off-hook condition, an exemplary user response may be to place the call, possibly a call to the person listed in the calendar event or the voicemail sender, respectively.

Next, in step 140, using the selected, specific configuration information (previously downloaded and stored), the calling device automatically creates a second communication session with a predetermined speech server designated by the second configuration, such as by using the downloaded hotline number for the specific speech server. The session or connection is considered "automatic" because no user intervention is required—it is not necessary for the user to input or dial the telephone number of the speech server. In an alternative exemplary embodiment, instead of using the downloaded hotline number, the user initiates an automatic connection by selecting a speed dialing option or speaking a voice command. If there is more than one hotline number, the user may select one of several predetermined hotline numbers. In yet another exemplary embodiment, the user has an option to prevent the automatic connection from forming by dialing one or more touch-tone digits within a predetermined amount of time after the calling device goes off-hook or by pressing at least one button on the calling device or the telephone. Following step 140, in selected exemplary embodiments, the speech server provides a smart dial tone, such as voice prompt discussed above, in step 150. In alternative embodiments, such as smart dial tone may be implicit and occurring in the background, such that a user may go off-hook and immediately begin speaking, knowing that the connection or session to the speech server has been automatically created and that the speech server is waiting for the voice sample, provided in step 160.

In step 160, the user provides one or more voice samples, generally in response to the smart dial tone (voice prompt). The one or more voice samples may include, but are not limited to, a telephone number; the name of a person or location to call; a request to activate call forwarding; a request to change a series of reach numbers; a request to activate or deactivate call forwarding; a request to access voicemail or email; a request to answer an incoming call; a request to look up a person or organization; a request to locate a person; a request to block all or select incoming calls; a request for usage instructions (e.g. "help"); a request to return a call based on an incoming call, email message, or voicemail message; a request for a web search; a request for traffic, weather, sports, stocks, or other news; a request to access an account for purposes of checking account status or executing transactions, a request to check securities prices and/or execute securities transactions; a request to change call screening options; a request to provide information on an incoming call; a request to accept or reject an incoming call; a request to play an announcement to an incoming caller; a request to modify options for on-hold calls (e.g., play music, collect caller information, play an advertisement, etc.); a request to activate or deactivate do-not-disturb; a request to activate or deactivate video transmission; a request to transfer an incoming call; a request to change voicemail configurations such as the greeting; a request to forward email; a request to enable or disable a pager or change a pager number or code; or a request to change the hotline number.

In step 170, the speech server takes action in response to the user's voice sample(s), such as performing or providing the appropriate response to the user's request. For example, if the user says, "Call David Thomson," the speech server may look up the telephone number for David Thomson and transfer the call to the number found. If the user's request is not understood, the speech server may ask the user to repeat the request, ask the user to enter the request via touch-tone, or transfer the call to a live attendant. One course of action the speech server may take in response to the user's voice sample(s) is to place a telephone call. The telephone call may be conferenced with or hairpinned through the speech server. It may alternatively be released to the public switched telephone network (PSTN) or VoIP network so that the speech server is no longer connected to the call or part of the IP session, illustrated below. Following step 170, when additional information is needed in step 180, the method returns to step 160 to obtain additional voice samples, such as requests or clarifications. When no additional information is needed, the method may end, return step 190.

Figure 2:
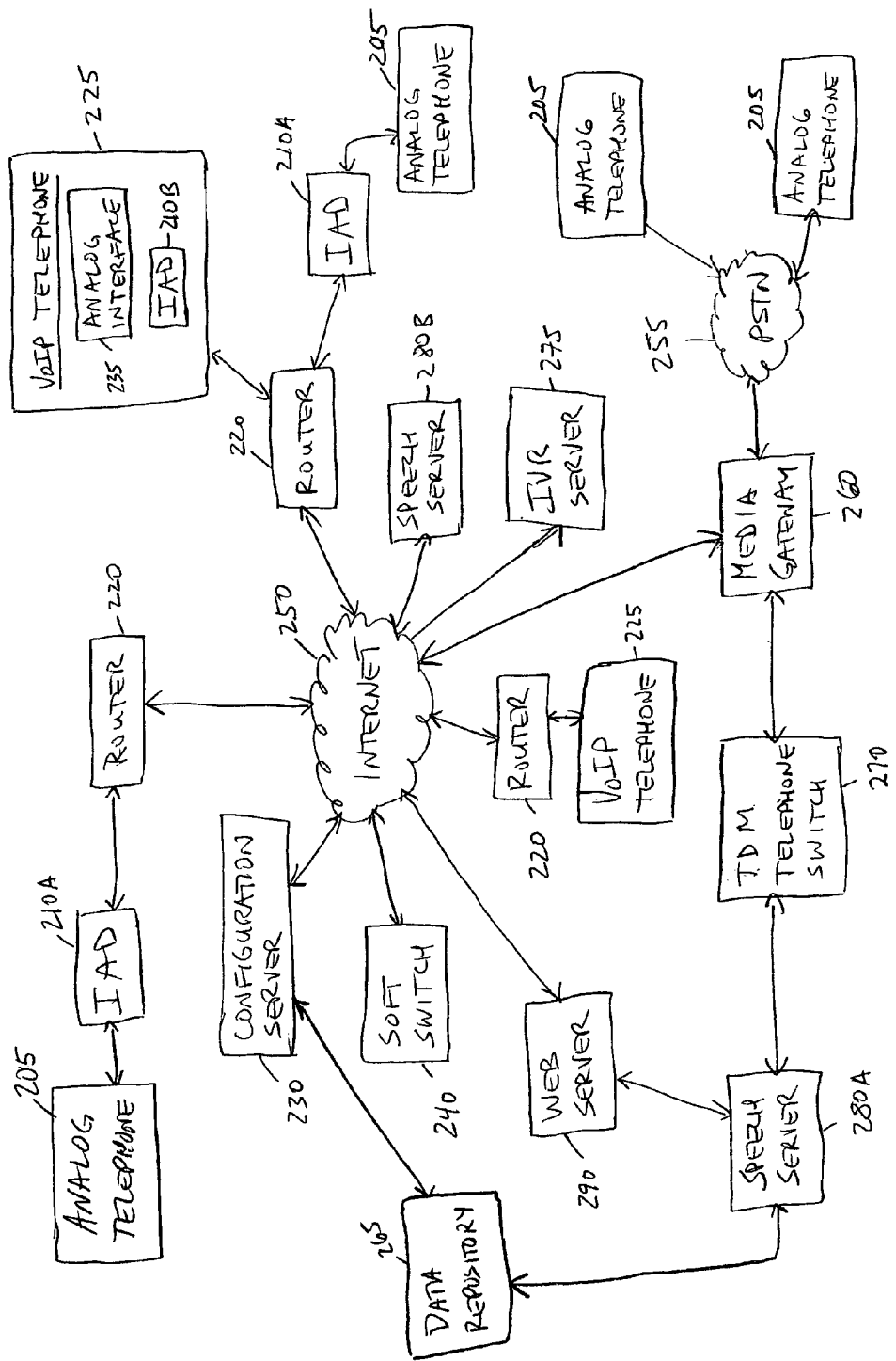
FIG. 2 is a block diagram illustrating a plurality of exemplary system embodiments in accordance with the teachings of the present invention.

FIG. 2 is a block diagram illustrating a plurality of exemplary system embodiments in accordance with the teachings of the present invention, for downloading a configuration and automatically placing a VoIP call using smart dial tone. In the various exemplary embodiments, the system of the present invention comprises a configuration server 230 and a speech server 280 (illustrated as speech servers 280A and 280B), which are then coupled through a network, such as the Internet or the PSTN, to an IAD 210 (illustrated as IADs 210A and 210B). The various IADs are illustrated as a stand-alone device (IAD 210A) which is then coupled to an analog telephone 205, or as is part of a VoIP telephone 225 (IAD 210B, together with an analog interface 235 (which includes items such as analog-to-digital and digital-to-analog converter, a microphone, a speaker, etc.)). Speech servers 280 are illustrated in two forms, as speech server 280A for processing analog speech signals, and another as speech server 280B, for directly processing digital speech signals contained as datagrams in IP packets received via the Internet 250.

When an IAD 210 is installed, or as needed after installation, IAD 210 utilizes it s initial, generic configuration to establish a session with the configuration server 230, such as when the IAD 210 is first powered up and connected to Internet 250, and downloads a specific configuration from configuration server 230 for its general use, as indicated above. The connection between the IAD 210 and the Internet 250 is optionally via one or more routers 220. This configuration download may occur at various times, such as during user enrollment as part of a setup process when the user obtains the speech service or when a user uses the speech service for the first time; before the IAD is delivered to the user and optionally again after delivery; or may occur at times specified in the configuration. In addition, the configuration download may also occur at regular intervals (e.g., at 1:00 am daily); when IAD 210 is unable to place a call; when IAD 210 detects a problem or other anomalous condition; when IAD 210 is reset; or based on other action taken by the user, such as logging into web server 290 and changing the user profile or subscription options, or calling speech server 280 and requesting a profile or subscription change.

In the various exemplary embodiments, other systems in FIG. 2 can also cause IAD 210 to download a new configuration. For example, if speech server 280, web server 290, or media gateway 260 is running at close to capacity or detects an error condition, one or more of these servers may direct configuration server 230 or IAD 210 to execute a new configuration download with a new hotline number to direct traffic to another location. If the service subscription options for the user change, a new configuration may direct calls to a different speech server 280 (or to the same speech server 280, but with a different ANI or Caller ID). Service subscription options may change because new options are made available, to accommodate the user's language, the user requests a change, the user moves to a new location, or the user's account is delinquent.

Once configured with the operational configuration information, the IAD 210 (with analog telephone 205 or as part of a VoIP telephone 225) may automatically begin use of the speech server 280, such as by going off-hook. Typically, as part of this process, IAD 210 registers with a soft switch 240 for address translation (between telephone numbers and IP addresses), and to establish an audio (and optionally a video) path. Analog telephone 205 provides an audio signal to IAD 210, which converts the audio signal to IP packets and transmits the packets to a router 220. Depending upon the selected embodiment, these voice packets may be directly processed by a speech server 280B, or converted into an analog form for processing by speech server 280A. In the latter case, voice packets from IAD 210 are routed through the Internet 250 to a media gateway 260, where they are assembled into an audio signal. The audio signal, in turn, may be provided to a TDM telephone switch 270 and then to speech server 280A. TDM telephone switch 270 may be a PBX or another analog or digital switch. Speech servers 280A and 280B use a speech recognizer and/or touch-tone detector to analyze the user's voice sample and/or touch-tone input. In addition, speech servers 280A and 280B may also provide audio (and optionally video) signals to the user (in either analog or digital form) in response to and/or as a prompt for the user's voice sample, which then are transmitted in path which is the reverse of that taken by audio signals from telephone 205.

Analog telephone 205 with IAD 210 and VoIP telephone 225 are illustrative, and represent only one of many equivalent options for devices for placing and receiving packet calls or sessions. Other equivalent devices include, for example and without limitations, a video phone, a peer-to-peer phone, or any other set of equipment capable of transmitting and receiving audio packets. Router 220 and IAD 210 are shown here as separate functions, but may be combined into a single unit. Router 220 may be omitted from the architecture in some instantiations of this invention. In other instantiations, routers may be inserted at other locations such as between Internet 250 and media gateway 260. Analog telephone, IAD 210, and router 220 may also be combined into a single unit. SoftSwitch 240, configuration server 230, TDM telephone switch 270, speech server 280, and web server 290 may be separate servers or they may be combined into one or more multifunction servers. The configuration of a media gateway 260, TDM telephone switch 270, and speech server 280 is illustrative, since the functions may be combined or eliminated. For example, if speech server 280 has VoIP capability, as indicated above for speech server 280B, then media gateway 260 and TDM telephone switch 270 may be eliminated. Alternatively, if TDM telephone switch 270 is replaced with a VoIP switch, the positions of telephone switch 270 and media gateway 260 may be reversed.

A possible action taken by speech server 280 is to change the hotline number. In another exemplary embodiment, instead of changing the IAD 210 configuration, the hotline number is changed by programming the specified system (i.e., the system reached by calling the original hotline number) to forward the call to a different number. When the user goes off-hook, IAD 210 is connected automatically to a first server, which then forwards the call to a second server. The forwarding number may depend on the IAD 210 serial number and/or the user profile information; for example, the first server may examine the IAD 210 serial number, look up the identity of the server associated with IAD 210, and forward the call to the associated server in response to the serial number and/or user profile. In another exemplary embodiment, the hotline number may be changed by updating the operational configuration in IAD 210, such as by downloading part or all of a new operational configuration to IAD 210 from configuration server 230. This revision may occur on demand by configuration server 230, when IAD 210 connects to configuration server 230 during power-up, at regular intervals, in response to error conditions, in response to action by the user, or according to other IAD configuration update methods known in the art.

In another exemplary system embodiment in accordance with the teachings of the present invention, a possible action taken by speech server 280 is to set up a voice call in which a first VoIP phone 225 (or, equivalently, an analog telephone 205 with IAD 210A) connects to the Internet via router 220 and registers with soft switch 240. Soft switch 240 establishes a link between the first VoIP phone 225 and a second VoIP phone 225 (or its equivalent) via one or more routers 220. In this example, since the first and second VoIP phones 225 may communicate directly via a packet network, no media gateway 260 is necessary to convert between IP packets and analog signals for the PSTN 255. In other embodiments, the media gateway 260 will convert between IP packets and analog signals, for transmission through the PSTN 255, for communication with PSTN-connected analog telephones 205.

Referring to both FIGS. 1 and 2, and more particularly to the configuration download (steps 110 and 120 in FIG. 1), there are several variations on the remote IAD 210 or VoIP telephone 225 configuration setup. In a first variation, the user performs a web site login. The IAD 210 or VoIP telephone 225 is shipped pre-loaded with the IP address of a configuration server 230. When the IAD 210 or VoIP telephone 225 is powered on and connected to the Internet, it links to the configuration server 230, and transmits its serial number to the configuration server 230 and/or to the speech server 280. The user logs onto the speech service website (or, equivalently, initiates a software setup application on a computer) and enters the user account information and the serial number of the IAD 210 or VoIP telephone 225, and the configuration server 230 correspondingly creates a data record linking the user account with the IAD 210 or VoIP telephone 225 serial number, in a data repository 265, such as a database.

In a second variation, the user logs onto the speech service website, as in the first variation, but in the second variation, configuration server 230 detects that IAD 210 belongs to the user by comparing part or all of IAD 210's IP address with part or all of the IP address of the user's computer that is running the web browser and/or by comparing the time the IAD 210 logged in with the time the user logged in. (Similarly, if IAD 210 and the user's computer are connected to a router, the configuration server may detect the IP address of the router instead of that of IAD 210 and the user's computer.) By using the IP address (and/or the time), the configuration server assumes that the user is logged into a terminal on a network with the same (or similar) IP address as that of IAD 210 and is able to infer that IAD 210 belongs to the user.

In a third variation, prior to shipping, the IAD 210 or VoIP telephone 225 serial number may be associated with the user account, with this information then stored in the database prior to user login or setup of the IAD 210 or VoIP telephone 225. The IAD 210 or VoIP telephone 225 serial number and associated user account information is made available to the speech server 280 (i.e., the speech server 280 gains access to a data record linking the serial number to the account information). The configuration server 230 downloads a configuration, including possibly a hotline number, to the IAD 210 or VoIP telephone 225. The hotline number may be the telephone number of the speech server.

In fourth variation, an IVR server is utilized. The IAD 210 or VoIP telephone 225 is shipped preloaded with a first configuration, including the IP address of a configuration server 230 and the hotline number of an IVR server 275. The user connects the IAD 210 or VoIP telephone 225 to the network (and a telephone to the IAD 210), and goes off-hook. The IAD 210 or VoIP telephone 225 connects to the configuration server 230 and the IVR server 275 based on preloaded configuration information. The IAD 210 or VoIP telephone 225 transmits its serial number to the configuration server 230 and/or to the speech server 280. The IVR server 275 prompts the user with an audio announcement to enter the user account information. The user provides the user account information by (a) voice, (b) touch-tone, (c) logging into the IAD with a web browser, or (d) logging onto the IVR server 275 from a computer and typing the information. Also in response to an IVR prompt, if the IAD 210 or VoIP telephone 225 is unable to transmit its own unique identifier automatically, the user provides the IAD serial number by (a) voice, (b) touch-tone, (c) logging into the IAD with a web browser, or (d) logging onto the IVR server 275 from a computer and typing the information. The configuration server 230 also creates a data record linking the user account with the IAD 210 or VoIP telephone 225 serial number, which is also made available to the speech server 280. Alternatively, prior to shipping, the IAD 210 or VoIP telephone 225 serial number may be associated with the user account, with this information then stored in the database prior to user login or setup of the IAD 210 or VoIP telephone 225. The configuration server 230 downloads a second configuration to the IAD 210 or VoIP telephone 225, including possibly a hotline number, such as the telephone number of the speech server 280.

In sixth variation, IAD 210 or VoIP telephone 225 login is utilized. The IAD 210 or VoIP telephone 225 is also shipped pre-loaded with the IP address of a configuration server 230. The IAD 210 or VoIP telephone 225 is powered on, connected to the Internet and creates a link to the configuration server 230. The IAD 210 or VoIP telephone 225 transmits its serial number to the configuration server 230 and/or to the speech server 280. This serial number is also made available to the speech service (i.e. the speech server has access to a data record linking the serial number to the account information). The user then logs onto the IAD 210 or VoIP telephone 225 from another computer, and enters the user account information into the IAD 210 or VoIP telephone 225. The configuration server 230 downloads a second configuration, including possibly a hotline number, to the IAD 210 or VoIP telephone 225. In the event this download of second configuration information does not occur, the user may also enter the hotline number into the IAD 210 or VoIP telephone 225. The configuration server 230 creates a data record linking the user account with the IAD 210 or VoIP telephone 225 serial number. Also alternatively, prior to shipping, the IAD 210 or VoIP telephone 225 serial number may be associated with the user account, with this information then stored in the database prior to user login or setup of the IAD 210 or VoIP telephone 225.

When the user logs onto the IAD 210 or VoIP telephone 225, this may be done by connecting the IAD 210 or VoIP telephone 225 and another computer to a network and entering the IAD's or VoIP telephone's IP address or other unique identifier into a web browser or other software application on the other computer. The user may alternatively log onto the IAD 210 or VoIP telephone 225 by visiting a web site that has the ability to connect to the IAD 210 or VoIP telephone 225. The user may alternatively log onto the IAD using a telephone instead of a computer, in which case the IAD 210 (or VoIP telephone 225) may play audio prompts to the user and accept touch-tone or voice input. The user may alternatively configure the IAD 210 or VoIP telephone 225 by pressing keys on the analog telephone or VoIP telephone 225, by inserting hardware such as EPROMs, EEPROMs or FLASH memory, by connecting a memory stick or other data device, or by changing the position of switches, buttons, or jumpers. The user may alternatively execute a setup program provided on a CD or other media on a computer, where the computer then loads configuration information to IAD 210.

In addition, the various steps described above may be performed in a wide variety of orders. For example, the IAD 210 or VoIP telephone 225 may be connected to the Internet before or after the user logs onto the IAD 210 or VoIP telephone 225 or the speech service website. Some steps may be skipped entirely; for example, the two steps in each example of downloading a configuration and creating a data record may not both be necessary and one or both may be skipped for alternative embodiments of this invention. In each example where the IAD dials a hotline address, the user may optionally dial the address instead. There may be more than one hotline number, in which case the IAD may try them one at a time until it finds a reachable destination. In each example where both the (1) IAD serial number and (2) the user account information is provided, then only one of (1) the IAD serial number or the (2) user account information need be provided if there exists a record available (in the network or in a database) to the speech service linking the IAD serial number to the user account information.

In steps where the IAD 210 or VoIP telephone 225 is pre-loaded prior to shipping to the user, the IAD 210 or VoIP telephone 225 may alternatively be configured by the user according to instructions supplied by the service provider. Action taken by the user may alternatively be taken by the user's agent such as a sales person, field engineer, service provider, or company telephone or IT administrator.

Meanings or definitions of some of the elements in this invention, and in particular the above implementation examples, may include, but are not limited to, the following:

The IAD 210 or VoIP telephone 225 unique identifier may be a serial number, a MAC address of the IAD 210 or VoIP telephone 225, a character string created by the user or provided to the user and then loaded into the IAD 210 or VoIP telephone 225, a transformation such as a hashing function of an identifier for the IAD 210 or VoIP telephone 225, or any other information that identifies the IAD 210 or VoIP telephone 225.

The user account information may be an account number, an email address, a telephone number, a Social Security number, a user's name, a user's invented name such as an alias, username, or handle, or any other piece of information that identifies the user or the user's account.

The link to a configuration server 230 may be any communication protocol, such as hypertext transfer protocol (HTTP), TFTP (Trivial File Transfer Protocol), or any other communication path that allows the IAD 210 or VoIP telephone 225 and the configuration server 230 to exchange information.

The configuration server 230 may be the same physical computer or server as the speech server 280, or it may be a different machine or collection of machines or processing nodes. In a peer-to-peer network, the configuration server 230 may be a central server, it may be a node or supernode, or it may be eliminated entirely where the configuration function is handled by peer computers on the network. In addition, the functions of the configuration server 230 may also be performed by an individual, such as an installer.

The IVR server 275 may be a speech server 280 and it may or may not be the same device as the configuration server 230. The IVR server 275 may optionally be part of the IAD 210 or VoIP telephone 225. We describe the functions of the IVR server, the speech server, and the configuration server as separate physical entities for illustrative purposes without restricting the physical configuration to specific machines.

The IAD may be a stand-alone box, part of a VoIP telephone 225, part of a soft switch 240, a video phone, part of a telephone switch, part of a VoIP media gateway 260, part of the software on a soft phone (a VoIP telephone 225 VoIP telephone 225 running in software on a computer), a peer-to-peer phone such as a Skype phone (software and/or hardware), an IVR system or server 275, a PDA (personal digital assistant), software running on a web site, software running on a wireless phone (such as a cell phone or wireless packet phone), or any other device or software application that performs the function of an IAD 210 or VoIP telephone 225, which is to provide a path for a voice signal to the Internet.

The Internet, as used in this application, may include the public Internet, a local network (LAN), a wide area network (WAN), a metropolitan area network (MAN), a dedicated private network, a virtual private network (VPN), an asynchronous transfer mode (ATM) network, an X.25 network, a resilient packet ring (RPR), or any other data network capable of carrying voice packets.

The hotline address provided by the configuration server 230 may be the hotline address of the configuration server 230 itself or it may be the hotline address of a different server such as a speech server 280 or IVR server 275. While this disclosure generally refers to packet voice communication using the term "VoIP," it is to be understood that the invention applies equally to other forms of packet voice communication such as peer-to-peer calling, ATM (Asynchronous Transfer Mode) switching, and packet voice calls that travel over data networks other than the Internet.

Numerous advantages of the present invention may be readily apparent. The exemplary method and system embodiments of the present invention provide for dynamically, automatically and remotely configuring an IAD 210 or VoIP telephone 225 for speech recognition capabilities, such as smart dial tone. The exemplary embodiments initially and remotely provide the hotline address and other IAD 210 or VoIP telephone 225 configuration data in the IAD 210 or VoIP telephone 225 for a speech server, after the IAD 210 or VoIP telephone 225 is shipped and installed, and with little or no user intervention. In addition, the exemplary embodiments are also dynamic, and are able to automatically and remotely alter or modify such IAD 210 or VoIP telephone 225 configurations for the provision of various speech service capabilities and features, such as speech recognition and various forms of smart dial tone.

It is to be understood that this application discloses a system and method for voice control of VoIP calls. While the invention is particularly illustrated and described with reference to exemplary embodiments, it will be understood by those skilled in the art that numerous variations and modifications in form, details, and applications may be made therein without departing from the spirit and scope of the novel concept of the invention. Some of these various alternative implementations are noted in the text. Other changes include, but are not limited to protocols used for communication between servers and devices and the specific arrangement of devices. It is to be understood that no limitation with respect to the specific methods and apparatus illustrated herein is intended or should be inferred. It is, of course, intended to cover by the appended claims all such modifications as fall within the scope of the claims.

It is claimed:

1. A method of providing access to a speech service, the method comprising:
   providing a calling device coupled to a communication network;
   establishing through the communication network a first communication session with a predetermined configuration server and the calling device, the predetermined configuration server designated by a first configuration provided in the calling device;
   downloading from the predetermined configuration server a second configuration for the calling device;
   establishing an off-hook condition in response to selecting one of a speed dialing option, picking up a handset, or speaking a voice command;
   using the second configuration and in response to the off-hook condition, automatically establishing through the communication network a second communication session with a predetermined speech server, the predetermined speech server being designated by the second configuration;
   producing a voice prompt, the voice prompt being produced from an element in the communication network other than the predetermined speech server;
   receiving at the predetermined speech server at least one voice sample provided by the calling device through the communication network; and
   in response to the at least one voice sample, the predetermined speech server performing a corresponding activity,
   wherein, in response to an action by a user within a predetermined amount of time, the calling device prevents automatically establishing the second communication session with the predetermined speech server.

2. The method of claim 1, wherein the calling device is at least one device from a group of devices comprising: a Voice over Internet Protocol ("VoIP") telephone, a soft phone, a video phone, a telephone coupled to an internet access device ("IAD"), a peer-to-peer telephone, a media gateway, or an Interactive Voice Response ("IVR") system.

3. The method of claim 2, wherein said soft phone is operative on at least one device selected from a group of devices comprising: a personal computer, a wireless handset, a packet-based wireless handset, a mobile computer, or a packet phone.

4. The method of claim 1, wherein said second configuration comprises at least one hotline number, and wherein the hotline number is a telephone number, Internet Protocol address, or other identifier associated with the predetermined speech server.

5. The method of claim 4, wherein said second configuration further comprises a first unique identifier of the calling device, of a plurality of unique identifiers, and an association of the first unique identifier with a selected user account, of a plurality of user accounts.

6. The method of claim 4, wherein said second configuration further comprises an automatic number identification ("ANI") for the calling device.

7. The method of claim 1, wherein the second configuration comprises a first hotline number and a second hotline number, and wherein the calling device is adapted to automatically make a first attempt at establishing the second communication session using the first hotline number, and when unsuccessful, automatically makes a second attempt at establishing the second communication session using the second hotline number.

8. The method of claim 1, wherein the downloading of the second configuration is in response to at least one condition of the group of conditions comprising: an installation of the calling device, a user service enrollment, an error condition, a detected traffic load, a user activity, a user profile modification, a subscription modification, or a session establishment condition.

9. The method of claim 1, wherein prior to downloading the second configuration, the method further comprising:
   uploading a unique identifier of the calling device.

10. The method of claim 9, further comprising:
    uploading user account information.

11. The method of claim 1, wherein the voice sample is spoken by a user and is at least one of the following group of voice samples comprising: a telephone number, a name, an information request, a requested transaction.

12. The method of claim 1, wherein the corresponding activity performed in response to the voice sample is at least one activity from a group of activities comprising: placing a telephone call, transferring the second communication session to a different location, placing a video phone call, providing news information, providing user calendar information, providing directory information, providing securities information, executing a transaction, modifying the second configuration.

13. The method of claim 1, wherein the step of downloading the second configuration further comprises logging into a speech service and entering user account information or logging into a speech service and entering a unique identifier for the calling device.

14. The method of claim 1, wherein the first configuration is a hotline number of the predetermined configuration server and is pre-loaded into a memory of the calling device.

15. A system for providing access to a speech service for a calling device, the calling device coupled to the system through a communication network, the system comprising:
   a calling device coupled to the system through a communication network, the calling device including a first configuration provided by the system;
   a configuration server coupled to the communication network and designated by the first configuration provided by the system in the calling device, the configuration server adapted to download a second configuration to the calling device through the communication network during a first communication session established with the calling device; and
   a speech server coupled to the communication network and designated by the second configuration, the speech server adapted to receive at least one voice sample provided by the calling device through the communication network during a second communication session established by an off-hook condition of the calling device, the off-hook condition established in response to selecting a speed dialing option, picking up a handset, or speaking a voice command, the speech server further adapted to perform a corresponding activity in response to the voice sample; and a network element coupled to the communication network for producing a voice prompt to which a user of the calling device may respond, the network element being distinct from the speech server, wherein the calling device is configured to prevent establishment of the second communication session with the speech server in response to an action by a user within a predetermined amount of time.

16. The system of claim 15, wherein the calling device coupled to the system is at least one device from a group of devices comprising: a Voice over Internet Protocol ("VoIP") telephone, a soft phone, a video phone, a telephone coupled to an Internet access device ("IAD"), a peer-to-peer telephone, a media gateway, an Interactive Voice Response ("IVR") system.

17. The system of claim 16, wherein said soft phone is operative on at least one device selected from a group of devices comprising: a personal computer, a wireless handset, a packet-based wireless handset, a mobile computer, packet phone.

18. The system of claim 15, wherein said second configuration comprises at least one hotline number, and wherein the hotline number is a telephone number associated with the predetermined speech server or an Internet Protocol address associated with the predetermined speech server.

19. The system of claim 18, wherein said second configuration further comprises a first unique identifier of the calling device, of a plurality of unique identifiers; an association of the first unique identifier with a selected user account, of a plurality of user accounts; and an automatic number identification ("ANI") for the calling device.

20. The system of claim 15, wherein the configuration server is adapted to download the second configuration in response to at least one condition of the group of conditions comprising: an installation of the calling device, a user service enrollment, an error condition, a detected traffic load, a user activity, a user profile modification, a subscription modification, or a session establishment condition.

21. The system of claim 15, wherein the configuration server is adapted to receive an upload of a unique identifier of the calling device and user account information.

22. The system of claim 15, wherein the voice sample is spoken by a user and is at least one of the following group of voice samples comprising: a telephone number, a name, am information request, or a requested transaction.

23. The system of claim 15, wherein the speech server is adapted to perform, in response to the voice sample, at least one activity from a group of activities comprising: placing a telephone call, transferring the second communication session to a different location, placing a video phone call, providing news information, providing user calendar information, providing directory information, providing securities information, executing a transaction, modifying the second configuration.

24. The system of claim 15, further comprising:
a data repository coupled to the configuration server, the data repository adapted to store a network data record to link a unique identifier for the IAD with a user account.

25. A system for providing access to a speech service for a calling device, the calling device coupled to the system through a communication network, the system comprising:

a calling device coupled to the system through a communication network, the calling device including a first configuration provided by the system;

a configuration server coupled to the communication network and designated by the first configuration provided by the system in the calling device coupled to the system, the configuration server adapted to download a second configuration to the calling device coupled to the system during a first communication session established with the calling device, the second configuration comprising a telephone number associated with a speech server or an internet protocol address associated with the speech sever, and wherein the configuration server is further adapted to receive an upload of a unique identifier of the calling device and user account information;

a data repository coupled to the configuration server, the data repository adapted to store a network data record to link a unique identifier with a user account;

the speech server coupled to the communication network and designated by the second configuration, the speech server adapted to receive at least one voice sample provided by the calling device coupled to the system during a second communication session established by an off-hook condition of the calling device, the off-hook condition established in response to selecting a speed dialing option, picking up a handset, or speaking a voice command, the speech server further adapted to perform a corresponding activity in response to the voice sample; and a network element coupled to the communication network for producing a voice prompt to which a user of the calling device may respond, the network element being distinct from the speech server, wherein the calling device is configured to prevent establishment of the second communication session with the speech server in response to an action by a user within a predetermined amount of time.

26. The system of claim 25, wherein the configuration server is adapted to download the second configuration in response to at least one condition of the group of conditions comprising: an installation of the calling device, a user service enrollment, an error condition, a detected traffic load, a user activity, a user profile modification, a subscription modification, or a session establishment condition.

* * * * *